(12) United States Patent
Veilleux, Jr. et al.

(10) Patent No.: US 10,809,021 B2
(45) Date of Patent: Oct. 20, 2020

(54) HEAT EXCHANGER WITH SLIDING APERTURE VALVE

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 2 days.

(21) Appl. No.: 15/372,606

(22) Filed: Dec. 8, 2016

(65) Prior Publication Data

US 2018/0164055 A1    Jun. 14, 2018

(51) Int. Cl.
*F28F 27/02* (2006.01)
*F28D 9/00* (2006.01)
(Continued)

(52) U.S. Cl.
CPC ......... *F28F 27/02* (2013.01); *B60H 1/00328* (2013.01); *B60H 1/00857* (2013.01); *B60H 1/00885* (2013.01); *B60K 11/04* (2013.01); *F24F 13/081* (2013.01); *F24F 13/12* (2013.01); *F28D 9/00* (2013.01); *F28D 9/0062* (2013.01); *F28D 9/02* (2013.01); *F28F 3/005* (2013.01); *F28F 3/08* (2013.01); *F28F 3/083* (2013.01); *F28F 13/06* (2013.01); *F28F 25/12* (2013.01);
(Continued)

(58) Field of Classification Search
CPC .... F28F 3/005; F28F 3/08; F28F 3/083; F28F 27/02; F28F 25/12; F28F 13/06; F28F 9/22; F28D 9/02; F28D 9/22; B60K 11/04; B60H 2001/00092; B60H 1/00328; B60H 1/00857; B60H 1/00885; F02C 7/14; F01P 7/10; F01P 11/10; F24F 13/081; F24F 13/12; B64D 2033/0233; B64D 33/02
USPC ......... 165/96, 231, 235, 248; 236/35.2, 35.3
See application file for complete search history.

(56) References Cited

U.S. PATENT DOCUMENTS 1,114,246 A * 10/1914 Furber ...................... F01P 7/12
                                                     123/41.04
1,135,685 A *  4/1915 Gunn et al. ............... E06B 7/10
                                                        49/38
(Continued)

FOREIGN PATENT DOCUMENTS

CA    2344442 A1 *  3/2000 ............. F24F 13/12
CA    2477581 A1 *  2/2005 ............ F24F 13/082
(Continued)

OTHER PUBLICATIONS

Compact Heat Exchangers A Review and Future Applicaitons for New Generation of High Temperature Solar Recievers—Li (2011).*
(Continued)

*Primary Examiner* — Len Tran
*Assistant Examiner* — Jenna M Hopkins
(74) *Attorney, Agent, or Firm* — Cantor Colburn LLP

(57) ABSTRACT

An apparatus is provided. The apparatus includes a heat exchanger providing heat transfer between a first medium and a second medium. The apparatus also includes a movable aperture integrated onto a face of the heat exchanger and regulating a flow of the first medium based on a position of the movable aperture. The apparatus further includes an actuator controlling the position of the movable aperture.

6 Claims, 3 Drawing Sheets

(51) Int. Cl.

| | | |
|---|---|---|
| *F28F 13/06* | (2006.01) | |
| *B60H 1/00* | (2006.01) | |
| *B60K 11/04* | (2006.01) | |
| *F24F 13/12* | (2006.01) | |
| *F28F 3/08* | (2006.01) | |
| *F28F 3/00* | (2006.01) | |
| *F28F 25/12* | (2006.01) | |
| *F28D 9/02* | (2006.01) | |
| *F24F 13/08* | (2006.01) | |
| *F28D 21/00* | (2006.01) | |
| *F01P 11/10* | (2006.01) | |
| *F02C 7/14* | (2006.01) | |
| *B64D 33/02* | (2006.01) | |
| *F01P 7/10* | (2006.01) | |

(52) U.S. Cl.
CPC .... *B60H 2001/00092* (2013.01); *B64D 33/02* (2013.01); *B64D 2033/0233* (2013.01); *F01P 7/10* (2013.01); *F01P 11/10* (2013.01); *F02C 7/14* (2013.01); *F28D 2021/0021* (2013.01); *F28F 2250/06* (2013.01)

(56) References Cited

U.S. PATENT DOCUMENTS

| | | | | |
|---|---|---|---|---|
| 1,492,897 A * | 5/1924 | Ryder | | F01P 7/10 49/38 |
| 1,806,153 A * | 5/1931 | Edwards | | F01P 7/12 123/41.05 |
| 2,551,921 A * | 5/1951 | Arsem | | F01P 7/12 123/41.04 |
| 2,751,154 A * | 6/1956 | Valtersson | | B60B 7/0086 236/35.2 |
| 2,936,692 A * | 5/1960 | White | | F24F 7/00 454/260 |
| 3,618,659 A * | 11/1971 | Rawal | | F24F 3/044 165/248 |
| 3,643,342 A * | 2/1972 | Tyson | | B29D 30/38 34/555 |
| 3,963,070 A * | 6/1976 | Alley | | F24F 13/15 165/98 |
| 4,177,861 A * | 12/1979 | Costello | | F28F 27/02 165/296 |
| 4,203,566 A * | 5/1980 | Lord | | B64D 13/00 165/41 |
| 4,577,680 A * | 3/1986 | Clem | | F28G 13/00 165/95 |
| 4,916,902 A * | 4/1990 | Pratt | | F01P 7/12 123/41.05 |
| 5,490,395 A * | 2/1996 | Williams | | F24F 13/12 62/187 |
| 5,507,547 A * | 4/1996 | Hattass | | B60J 7/003 296/211 |
| 5,771,647 A * | 6/1998 | Kempen | | F24F 13/08 403/282 |
| 5,865,398 A * | 2/1999 | Pashea | | B64D 33/02 244/53 B |
| 6,014,839 A * | 1/2000 | Ruggles | | E06B 7/086 327/307 |
| 6,302,785 B1 * | 10/2001 | McKinney | | F24F 13/12 160/369 |
| 6,508,703 B1 * | 1/2003 | Uemura | | B60H 1/00692 251/901 |
| 6,945,867 B2 * | 9/2005 | Park | | F24F 13/082 454/324 |
| 7,232,369 B2 * | 6/2007 | Karidis | | F24F 7/10 454/274 |
| 7,311,593 B2 * | 12/2007 | Tokunaga | | B60H 1/00692 165/43 |
| 7,371,161 B2 * | 5/2008 | Goupil, Jr. | | B60H 1/00692 454/121 |
| 7,431,641 B2 * | 10/2008 | Darling | | F24F 3/0442 454/333 |
| 7,992,664 B2 * | 8/2011 | Kiener | | B60K 11/085 180/68.1 |
| 8,191,618 B2 * | 6/2012 | Gering | | B60H 1/00278 165/202 |
| 8,474,512 B2 * | 7/2013 | Pettersson | | B60K 11/04 165/41 |
| 8,789,766 B2 * | 7/2014 | Baldauf | | B64D 13/00 137/3 |
| 8,915,320 B2 * | 12/2014 | Chinta | | B60K 11/085 180/68.1 |
| 9,222,447 B2 * | 12/2015 | Yamada | | F02M 31/20 |
| 9,617,907 B2 * | 4/2017 | Nam | | F28F 27/02 |
| 9,676,270 B2 * | 6/2017 | Tsuchihashi | | B60K 11/04 |
| 9,744,847 B2 * | 8/2017 | Anderson | | B60K 11/085 |
| 9,914,351 B2 * | 3/2018 | Kim | | B60K 11/085 |
| 2005/0048909 A1 * | 3/2005 | Park | | F24F 13/082 454/334 |
| 2006/0060401 A1 * | 3/2006 | Bole | | B60K 11/085 180/68.1 |
| 2006/0144582 A1 * | 7/2006 | Sekiya | | B60H 1/00692 165/202 |
| 2008/0119127 A1 * | 5/2008 | Stewart | | F24F 13/082 454/256 |
| 2009/0242185 A1 * | 10/2009 | Haseldine, Jr. | | F25D 21/00 165/231 |
| 2010/0218497 A1 * | 9/2010 | Pettersson | | B60K 11/04 60/599 |
| 2010/0229548 A1 * | 9/2010 | Kardos | | F02B 29/0475 60/599 |
| 2010/0229842 A1 * | 9/2010 | Pettersson | | B60K 11/085 123/568.12 |
| 2011/0073395 A1 * | 3/2011 | Lee | | B60K 11/085 180/68.1 |
| 2011/0147631 A1 * | 6/2011 | Menassa | | F24F 13/12 251/205 |
| 2011/0155365 A1 * | 6/2011 | Wiese | | F24F 7/013 165/244 |
| 2012/0132474 A1 * | 5/2012 | Charnesky | | B60K 11/085 180/68.1 |
| 2012/0222833 A1 * | 9/2012 | Vikstrom | | F28F 27/02 165/41 |
| 2012/0222851 A1 * | 9/2012 | Arinez | | F24F 11/76 165/247 |
| 2013/0284401 A1 * | 10/2013 | Kiener | | F01P 7/02 165/98 |
| 2014/0116648 A1 | 5/2014 | Jo et al. | | |
| 2014/0129078 A1 * | 5/2014 | Jeong | | G06F 11/30 701/32.8 |
| 2014/0295749 A1 * | 10/2014 | Hijikata | | B60K 11/085 454/256 |
| 2014/0308890 A1 * | 10/2014 | Schneider | | F24F 13/1426 454/335 |
| 2015/0020758 A1 * | 1/2015 | Hosono | | B60K 11/085 123/41.04 |
| 2015/0038067 A1 * | 2/2015 | Byon | | B60H 1/00021 454/160 |
| 2015/0072610 A1 * | 3/2015 | Coles | | F24F 13/12 454/324 |
| 2015/0090508 A1 * | 4/2015 | Chappex | | B60K 11/085 180/68.1 |
| 2015/0140922 A1 * | 5/2015 | Babur | | F24F 13/12 454/298 |
| 2015/0159541 A1 * | 6/2015 | Solazzo | | B60K 11/085 73/114.68 |
| 2015/0239337 A1 * | 8/2015 | Anderson | | B60K 11/04 180/68.1 |
| 2015/0315955 A1 * | 11/2015 | Nam | | F01P 5/02 123/41.04 |
| 2015/0330288 A1 * | 11/2015 | Nam | | B60K 11/085 165/96 |
| 2016/0001630 A1 * | 1/2016 | Nakao | | B60H 1/00692 165/42 |
| 2016/0040634 A1 * | 2/2016 | Haight | | B01D 46/0083 95/26 |

(56) References Cited

U.S. PATENT DOCUMENTS

| | | | | |
|---|---|---|---|---|
| 2016/0263963 A1* | 9/2016 | Sato | ............ | B60H 1/00692 |
| 2016/0312437 A1* | 10/2016 | Hirayama | ............ | E02F 9/0866 |
| 2017/0054188 A1* | 2/2017 | Blatchley | ............ | B60H 1/00899 |
| 2017/0058774 A1* | 3/2017 | Pickford | ............ | F02C 9/32 |
| 2017/0361701 A1* | 12/2017 | Dunty | ............ | B60R 19/52 |
| 2019/0186362 A1* | 6/2019 | Blumrich | ............ | F02C 7/18 |

FOREIGN PATENT DOCUMENTS

| | | | |
|---|---|---|---|
| CA | 2726195 A1 * | 6/2011 | ............ F24F 13/12 |
| DE | 102014117817 A1 * | 6/2016 | ............ F01P 7/10 |
| EP | 0640506 A1 * | 3/1995 | ............ B60J 7/003 |
| EP | 1515110 A2 | 3/2005 | |
| EP | 1630014 A1 * | 3/2006 | ......... B60H 1/00692 |
| EP | 1630017 A2 * | 3/2006 | ......... B60H 1/00692 |
| EP | 1657517 A1 | 5/2006 | |
| EP | 2412269 A1 * | 2/2012 | ............ A45C 13/16 |
| EP | 2881271 A1 * | 6/2015 | ......... B60H 1/00692 |
| FR | 2502754 A1 * | 10/1982 | ............ F24F 13/12 |
| FR | 3042031 A1 * | 4/2017 | ............ B60K 11/085 |
| JP | H09152297 A | 6/1997 | |
| JP | 2002165310 A * | 6/2002 | ............ B60K 11/02 |
| WO | WO-2004108449 A1 * | 12/2004 | ......... B60H 1/00692 |
| WO | WO-2017021205 A2 * | 2/2017 | ............ B60K 11/085 |

OTHER PUBLICATIONS

FADEC—Full Authority Digital Engine Controls—ECE, Electronic Concepts and Engineering, Inc. (2008).*

Full Authority Digital Engine Control (FADEC)—Kumar (Oct. 2015).*

Radiators in Automotive Engines—ASE Certification Training HQ (Oct. 2015).*

Search Report dated Apr. 9, 2018, EP Application No. EP17206117, 7 pages.

* cited by examiner

HEAT EXCHANGER WITH SLIDING APERTURE VALVE

BACKGROUND

Conventional commercial aircraft use traditional air-cooled oil cooler (ACOC) and/or fuel-cooled oil cooler (FCOC) heat exchangers to extract thermal energy out of hot lubrication oil used for engine main bearings and other mechanically driven accessory drive components to maintain the lubrication oil within its optimal operational temperature limits.

In some cases, it can be desirable to reduce the flow of (or shut off completely) oil or air to the traditional ACOC heat exchanger. Similarly, it can be desirable to reduce the flow of (or shut off completely) oil or fuel to the traditional FCOC heat exchanger. A reduction operation or shut off operation can be carried out with a large butterfly valve and an actuator for air (in the traditional ACOC heat exchanger) or a large oil valve for oil flow (in the traditional FCOC heat exchanger). However, the large butterfly valve and the actuator add weight, size, and cost penalties to the traditional ACOC and/or FCOC heat exchangers of the convention commercial aircraft.

BRIEF DESCRIPTION

Disclosed is an apparatus according to one or more embodiments. The apparatus includes a heat exchanger providing heat transfer between a first medium and a second medium. The apparatus also includes a movable aperture integrated onto a face of the heat exchanger and regulating a flow of the first medium based on a position of the movable aperture. The apparatus further includes an actuator controlling the position of the movable aperture.

According to another embodiment or the apparatus embodiment above, the heat exchanger can be a compact plate-fin heat exchanger.

According to another embodiment or any of the apparatus embodiments above, the heat exchanger can comprise one or more roller bearings mounted behind the movable aperture to minimize friction and associated movement force.

According to another embodiment or any of the apparatus embodiments above, the movable aperture can comprise a short stroke sliding aperture valve.

According to another embodiment or any of the apparatus embodiments above, the actuator can comprise a short stroke linear actuator.

According to another embodiment or any of the apparatus embodiments above, the position of the movable aperture can be switched between an open position and a closed position by the short stroke actuator.

According to another embodiment or any of the apparatus embodiments above, the actuator can comprise a torque motor servo.

According to another embodiment or any of the apparatus embodiments above, the position of the movable aperture can be modulated across a range of 100% open to 0% flow by the torque motor servo.

According to another embodiment or any of the apparatus embodiments above, the first medium can comprise air or fuel flowing in a first direction across a first set of fins at a variable cooling.

According to another embodiment or any of the apparatus embodiments above, the second medium can comprise lubrication oil.

According to another embodiment or any of the apparatus embodiments above, the actuator can control the position of the moving aperture based on predictive inputs from a full authority digital engine controller (FADEC).

According to another embodiment or any of the apparatus embodiments above, the actuator can control the position of the moving aperture based on predictive inputs from an electronic engine controller (EEC).

According to another embodiment or any of the apparatus embodiments above, a plurality of actuators comprising the actuator can control positions of a plurality of apertures comprising the movable aperture.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

One or more embodiments herein disclose a heat exchanger with sliding aperture valve and a method of operating. The heat exchanger with sliding aperture valve provides a compact, lightweight, low cost apparatus with high performance and high efficiency that implements reduction and/or shut off operations of flow media. Thus, the technical effects and benefits of the heat exchanger with sliding aperture valve and the method of operating include eliminating additional components, plumbing, and mounting associated with the traditional ACOC and/or FCOC heat exchangers while providing a dynamically adjustable flow rates for air and/or oil or fuel.

Figure 1:
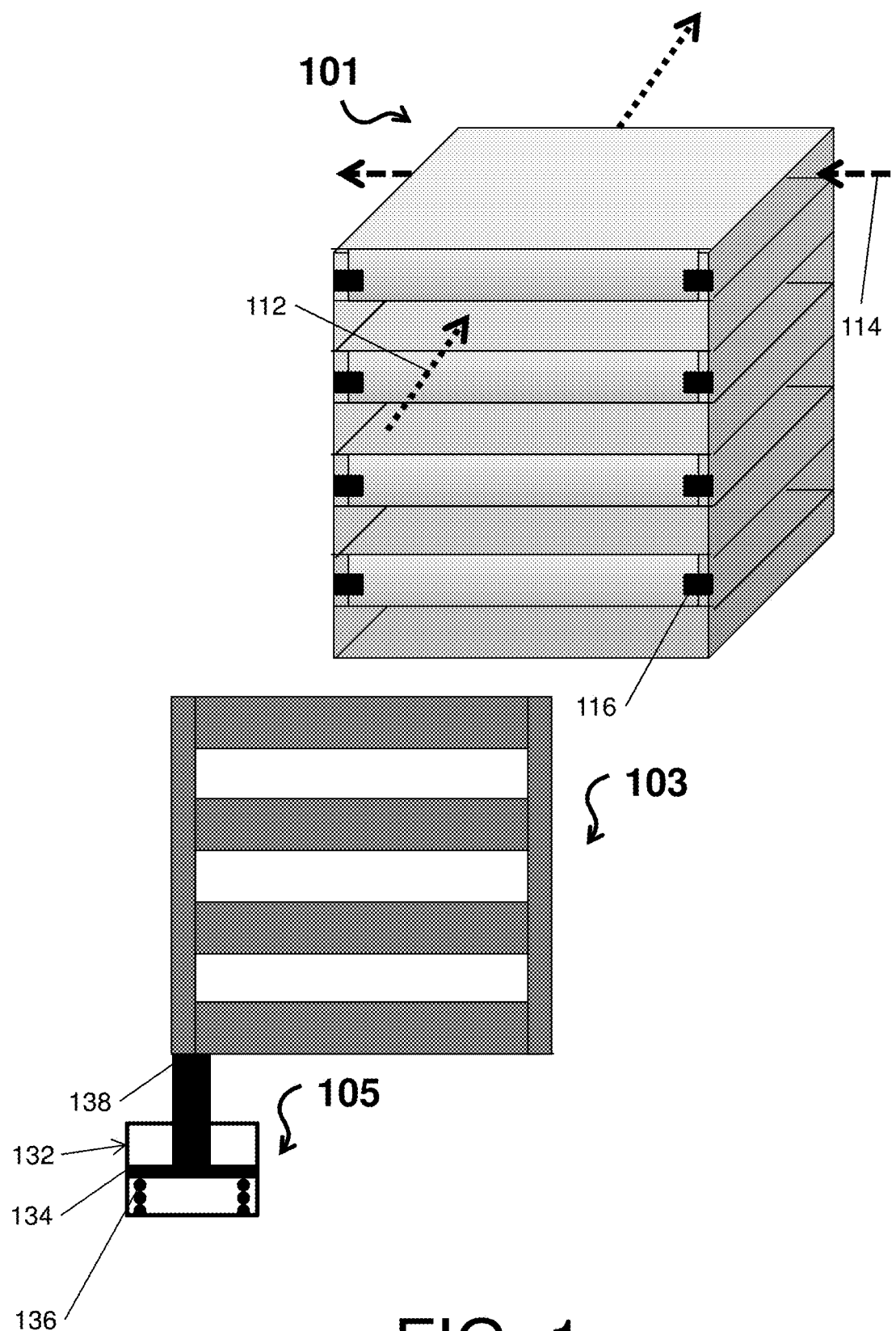
FIG. 1 depicts a heat exchanger with sliding aperture valve in accordance with one or more embodiments.

FIG. 1 depicts a heat exchanger with sliding aperture valve in accordance with one or more embodiments. The heat exchanger with sliding aperture valve comprises a compact plate-fin heat exchanger 101, a movable aperture 103, and an actuator 105. In general, the movable aperture 103 can be integrated on a face of the compact plate-fin heat exchanger (integrated on a face of a heat exchanger core) and a position of the movable aperture 101 can be controlled via the actuator 105. For ease of explanation, the movable aperture 103 and the actuator 105 are shown in FIG. 1 as detached from the compact plate-fin heat exchanger 101.

The compact plate-fin heat exchanger 101 is an apparatus built for efficient heat transfer from one medium to another (e.g., between the first and second media). Examples of heat exchangers also include plate-fin, plate, plate and shell, double pipe, shell and tube, adiabatic wheel, pillow plate, and fluid heat exchangers.)

The compact plate-fin heat exchanger 101 comprises a first set of fins enabling a flow of a first medium in a first direction 112 and a second set of fins enabling a flow of a second medium in a second direction 114. The compact plate-fin heat exchanger 101 comprises one or more roller bearings 116. The one or more roller bearings 116 can be mounted behind the movable aperture 103 (e.g., the sliding aperture valve) to reduce/minimize friction and associated movement force.

The movable aperture 103 can be a sliding panel that can cover (be integrated on a face of) either the first or second set of fins to regulate and/or stop the corresponding flows of media in the first direction or second direction 112 and 114. The movable aperture 103 (sliding panel) comprises flow windows/cut-outs that move up and down with the movable aperture 103 to modulate between one or more of a no-flow condition, a low-flow condition, and a high-flow condition. The movable aperture 103 can comprise any light-weight material, either metal or composite, in accordance with an expected maximum flow temperatures in the compact plate-fin heat exchanger 101. Although rectangular windows are shown in FIG. 1, one or more geometric shapes (regular or irregular) can be selected for the windows/cut-outs of the movable aperture 103. Note that a geometry and size of the compact plate-fin heat exchanger 101, as well as core operation, can be utilized to dictate a geometry selection of the windows/cut-outs. Note, also, that the movable aperture 103 can be applied to all types of heat exchangers including fuel, oil and air).

The actuator 105 can be any device for controlling the position of the movable aperture 103. Examples of the actuator 105 include a short stroke linear actuator, electric actuator, hydraulic actuator, fueldraulic actuator, etc. An electric motor or a torque motor servo can also be utilized to modulate the movable aperture 103. Note that when the movable aperture 103 is mounted on the one or more roller bearings 116 to reduce a friction load, the required forces on the solenoid/torque motor servo are minimized.

In a non-limiting embodiment, the movable aperture 103 comprises a short stroke sliding aperture valve 132 controlled by a short stroke linear actuator 138. The short stroke sliding aperture valve 132 comprises a compact piston 134 supported by a spring 136 at one end and receiving control pressurized flow acting on the piston face opposite the spring's upward movement. For instance, a light-weight dual-position solenoid (for a two position movement) can be utilized as the short stroke linear actuator for a Boolean on-off operation (as described with respect to FIG. 2) or a servo valve can modulate to any position from open to close (as described with respect to FIG. 3). Also, the actuator 105 can implement a proportional position operation to modulate to any position (from open to close). In this way, continuing with the ACOC and/or FCOC examples above, air or fuel flows in the first direction 112 across the first set of fins when the short stroke actuator has placed the short stroke sliding aperture valve 132 in an OFF or open position. Further, the air or the fuel does not flow in the first direction 112 across the first set of fins when the short stroke actuator has placed the short stroke sliding aperture valve in an ON or closed position. Note that, due to the short stoke, the heat exchanger with sliding aperture valve as a whole can be smaller and lighter than the traditional ACOC and/or FCOC heat exchangers.

Figure 2:
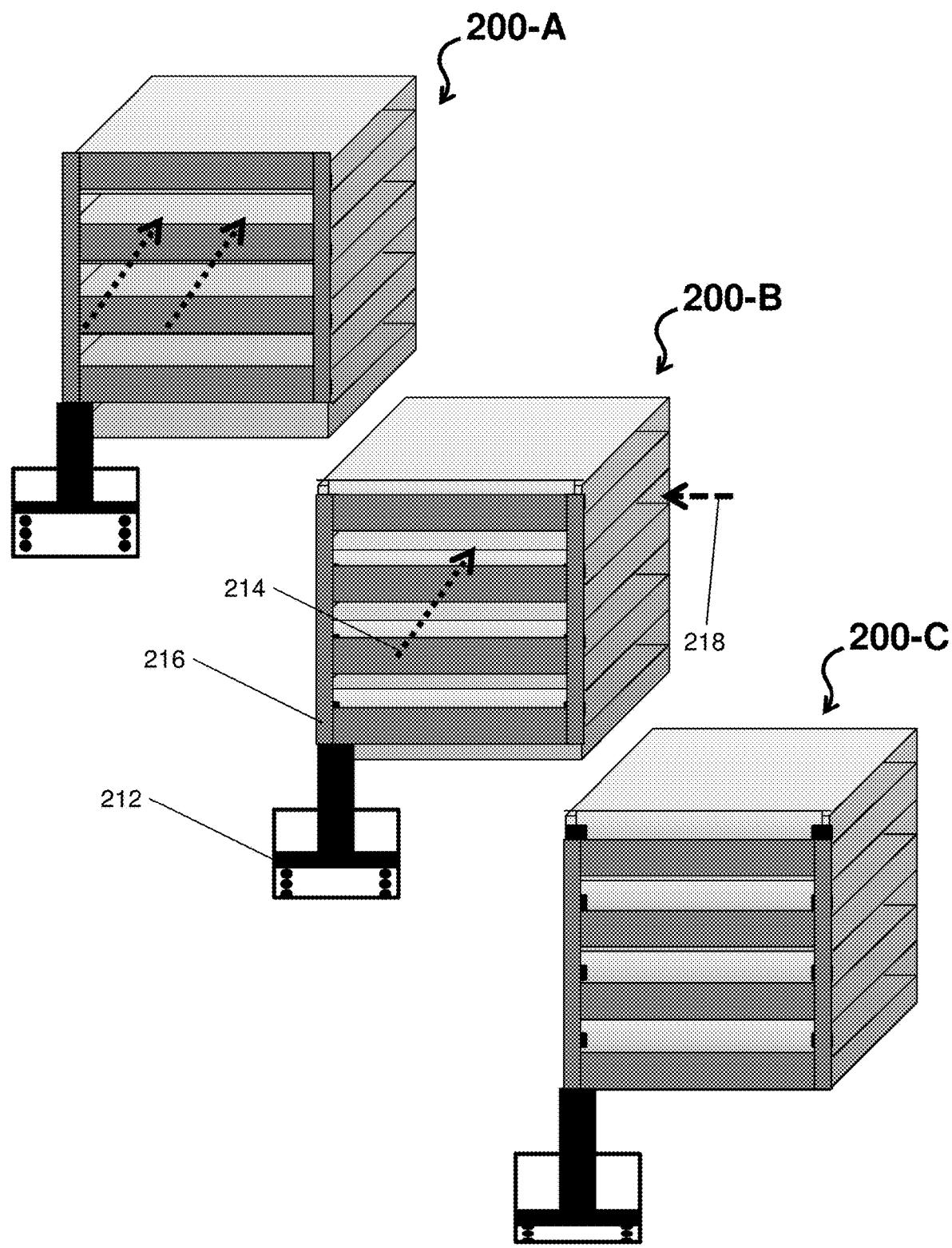
FIG. 2 depicts operational stages of a heat exchanger with sliding aperture valve in accordance with one or more embodiments.

Turning now to FIG. 2, a set of operational stages A, B, and C of a heat exchanger with sliding aperture valve 200 is depicted in accordance with one or more embodiments. The operational stages A, B, and C correspond to operations of torque motor servo 212 being utilized to modulate the sliding aperture valve. The operational stages A, B, C enable the heat exchanger with sliding aperture valve 200 to address de-congealing or icing by regulating and/or shutting off a first medium to achieve a right heat balance between the first and second media.

Further, continuing with the ACOC and/or FCOC examples above, air or fuel flows in a first direction 214 across a first set of fins at a variable cooling. The cooling is variable based on the torque motor servo 212 controlling a position of a sliding aperture valve 216 on the face of the first set of fins. The variable cooling is, in turn, a function of the position of the sliding aperture valve 216, which directly regulates a final air temperature of lubrication oil (e.g., flowing across a second set of fins in a second direction 218). Note that a modulation of heat transfer between the air or fuel flows and lubrication oil to manage icing can also be managed by adjusting the moving aperture 103 (shown in FIG. 1) based on predictive input from a full authority digital engine controller (FADEC) and/or an electronic engine controller (EEC) or similar microcontroller, which monitors environmental and/or fluid conditions with sensors (e.g., positions of aperture can be integrated with an engine's FADEC/EEC for optimum thermal load controls and minimal fuel burn).

As shown in FIG. 2, the first operational stage A of the heat exchanger with sliding aperture valve 200 comprises when the sliding aperture valve 216 is deactivated, thereby exposing all fins to the air or fuel flows. That is, the sliding aperture valve 216 is in a "100% open" position.

The second operational stage B of the heat exchanger with sliding aperture valve 200 comprises when the sliding aperture valve 216 is in an intermediate position, thereby partially exposing all fins to the air or fuel flows. That is, the sliding aperture valve 216 can be set to a position along a range of less than "100% open" to "0% flow."

The third first operational stage C of the heat exchanger with sliding aperture valve 200 comprises when the sliding aperture valve 216 is activated, thereby blocking all fins from the air or fuel flows. That is, the sliding aperture valve 216 is in a "0% flow" position.

Figure 3:
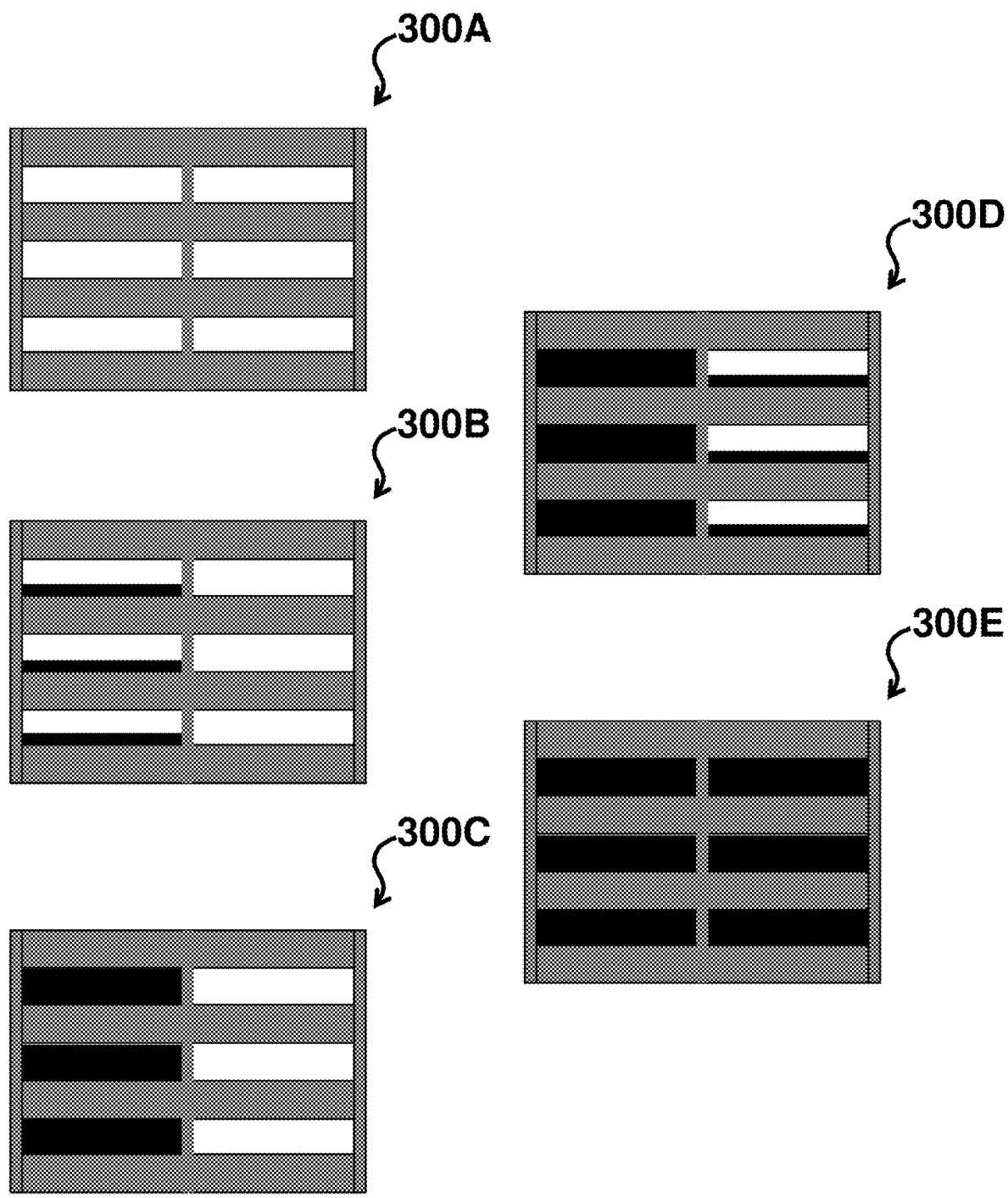
FIG. 3 depicts operational stages of a heat exchanger with sliding aperture valve in accordance with one or more embodiments.

Turning now to FIG. 3, a set of operational stages A, B, C, D, and E of a heat exchanger with sliding aperture valve 300 is depicted in accordance with one or more embodiments. The set of operational stages A, B, C, D, and E correspond to operations of a plurality of actuators controlling a plurality of moving apertures.

For example, the first operational stage A of the heat exchanger with sliding aperture valve 300 comprises when the plurality of moving apertures is deactivated, thereby exposing all fins to the air or fuel flows. That is, the plurality of moving apertures is in a "100% open" position.

The second operational stage B of the heat exchanger with sliding aperture valve 300 comprises when a first subset of the plurality of moving apertures is in an intermediate position (set to a position along a range of less than "100% open" to "0% flow" by a corresponding subset of the plurality of actuators), while a second subset of the plurality of moving apertures is deactivated. Thus, the fins are partially exposed to the air or fuel flows.

The second operational stage C of the heat exchanger with sliding aperture valve 300 comprises when the first subset of the plurality of moving apertures is activated, while a second subset of the plurality of moving apertures is deactivated. Thus, the fins are less exposed to the air or fuel flows than in the second operational stage B.

The second operational stage D of the heat exchanger with sliding aperture valve 300 comprises when the first subset of the plurality of moving apertures is activated, while a second subset of the plurality of moving apertures is in an intermediate position (set to a position along a range of less than "100% open" to "0% flow" by a corresponding subset of the plurality of actuators). Thus, the fins are less exposed to the air or fuel flows than in the second operational stage C.

The first operational stage E of the heat exchanger with sliding aperture valve 300 comprises when the plurality of moving apertures is activated, thereby blocking all fins to the air or fuel flows. That is, the plurality of moving apertures is in a "0% flow" position.

The technical effects and benefits of the embodiment herein include utilizing advanced additive manufacturing to produce described movable apertures, which enables a high level of customization to each specific heat exchanges application while increasing the speed of prototype-to-product delivery and minimizing wasteful processes. In addition, utilizing advanced additive manufacturing enables each movable aperture to include same size windows, same geometry windows and/or a mix of variously shaped and sized windows (e.g., permits specific customization to unique heat exchanger core application and desired performances). Additional technical effects and benefits of embodiments herein include, producing smaller more integrated heat exchanger core and control valve operations, providing operational flexibility of heat exchanger cores (e.g., enabling a "one size fits all" approach), and alignment with electric aircraft architecture (e.g., movable aperture can utilize electrically controlled position solenoid or motor servo).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for an aircraft, the apparatus addressing de-congealing or icing of the aircraft by regulating a flow of a first medium to manage a thermal load, the apparatus comprising:
    a plate-fin heat exchanger providing heat transfer between the first medium and a second medium, the plate-fin heat exchanger comprising a face receiving the first medium, the first medium comprising air or fuel flowing in a first direction across a first fin set of the plate-fin heat exchanger at a variable cooling, and the second medium comprising lubrication oil flowing in a second direction across a second fin set of the plate-fin heat exchanger;
    a movable aperture integrated onto the face of the plate-fin heat exchanger and regulating the flow of the first medium based on a position of the movable aperture, the movable aperture comprising a sliding panel including flow cut-outs integrated to move up and down across the face of the plate-fin heat exchanger to regulate the variable cooling by regulating the flow of the first medium between a set of operational stages; and
    an actuator comprising a torque motor servo modulating and controlling the position of the movable aperture between the set of operational stages based on predictive inputs respective to managing the thermal load; and
    a controller providing the predictive inputs to the actuator to cause:
        the actuator to deactivate the movable aperture to a 100% open position to fully expose the first fin set to the first medium in accordance with a first stage of the set of operational stages,
        the actuator to set the movable aperture to an intermediate position between the 100% open position to a 0% flow position to partially expose the first fin set to the first medium in accordance with a second stage of the set of operational stages, and
        the actuator to activate the movable aperture to a 0% flow position to block the first medium from entering the plate-fin heat exchanger in accordance with a third stage of the set of operational stages,
    one or more roller bearings mounted behind the movable aperture to minimize friction and associated movement force.

2. The apparatus of claim 1, wherein the controller comprises a full authority digital engine controller (FADEC).

3. The apparatus of claim 1, wherein the controller comprises an electronic engine controller (EEC).

4. The apparatus of claim 1, wherein a plurality of actuators comprising the actuator controls positions of a plurality of apertures comprising the movable aperture.

5. The apparatus of claim 1, wherein the flow cut-out are rectangular in shape.

6. The apparatus of claim 1, wherein the actuator comprises the torque motor servo to modulate the movable aperture, which is mounted on the one or more roller bearings to reduce a friction load and minimize forces on the torque motor servo.

* * * * *